May 10, 1932. A. C. GOODWIN ET AL 1,857,277
SUSPENSION CLAMP FOR ELECTRIC CONDUCTORS
Filed Dec. 2, 1926
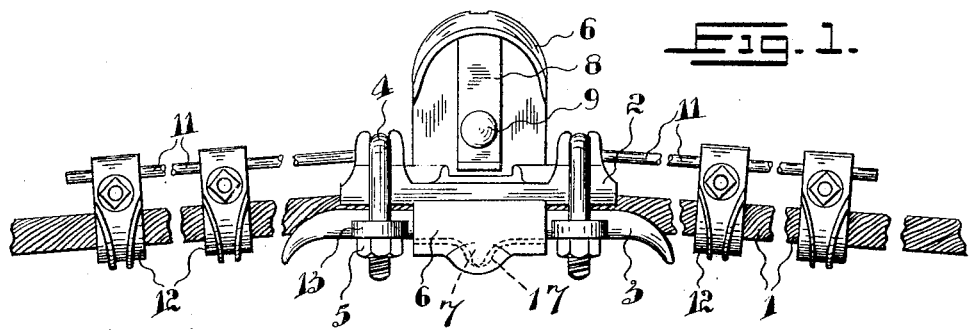
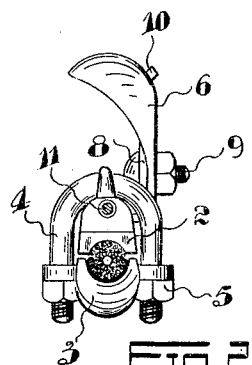 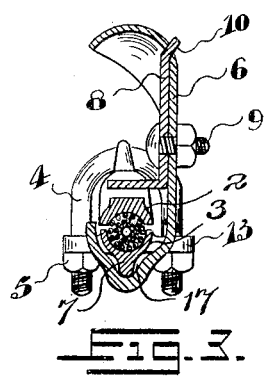 
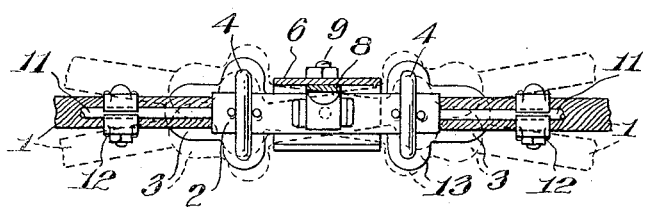
INVENTORS.
A. C. Goodwin
J. H. Barnard
BY J. Edward Maybee
ATTY.

Patented May 10, 1932

1,857,277

UNITED STATES PATENT OFFICE

ARTHUR C. GOODWIN AND THOMAS H. BARNARD, OF TORONTO, ONTARIO, CANADA

SUSPENSION CLAMP FOR ELECTRIC CONDUCTORS

Application filed December 2, 1926. Serial No. 152,191.

This invention relates to clamps as used for suspending electric cables from poles or towers and for supporting the dead ends of cables. Due to wind and other causes there is a continual vibration of the electric conductors manifesting itself in the form of waves running lengthwise of the cable. With the present type of clamp, the cable is firmly clamped at the poles or towers so that while the cable may vibrate between clamps, it is firmly held in place by the clamp, so that the cable, particularly if the loads are high, fails to stand up in use.

Our object therefore is to devise a form of clamp which will adequately support the cable at the poles or towers, but which will avoid the abrupt stopping of the vibrations at the clamps, and the consequent strain on the cable.

We attain our object by means of the constructions hereinafter described and illustrated in the accompanying drawings in which Fig. 1 is a side elevation of our improved clamp;

Fig. 2 an end view of the same;

Fig. 3 a vertical section through the same;

Fig. 4 an end view of one of the vibration dampeners; and

Fig. 5 a horizontal section through the hanger, the clamp being shown in plan.

In the drawings like numerals of reference indicate corresponding parts in the different figures.

The cable 1 is secured in a clamp comprising two members 2 and 3. The member 2 is arranged with saddles to receive U-bolts 4 and the member 3 is provided with lugs 13 having openings through which the legs of the U-bolts pass, the ends of the bolts having nuts 5 threaded thereon by means of which the parts of the clamp may be firmly secured in position on the cable.

The clamp is supported in a hook-shaped support or holder 6 which is adapted to be supported in any ordinary manner from the pole or tower. The support is preferably somewhat wider than the members 2 and 3 and is provided with a socket 17 in its bottom adapted to receive a ball pointed projection 7 on the under side of the member 3 and on which the latter may rock in any direction. The projection is of greater depth than the socket so that the main portion of the under side of the member 3 is held in spaced relationship to the support 6 as will be evident from the dotted lines in Fig. 1. To retain the clamp in the hook-shaped support a keeper 8 is vertically slidable on the support and is adapted to be locked in position as moved by the clamping bolt 9. The keeper, as will be seen from the drawings, does not tightly engage the clamp, but is spaced sufficiently therefrom to allow the clamp to move up and down in the support, but not sufficiently to allow the accidental disengagement of the clamp from the support. The back of the member 6 is notched at 10, to receive the end of the keeper, the notch, however, being of sufficient width to allow the clamp to rock without engaging the ends of the notch.

We also show in conjunction with our clamp vibration dampening means which consist of a long bar 11 carried by the clamp member 2 and secured in fixed position relative to the cable at intervals by means of small clamps 12. In practice these clamps 12 have the same effect as a weight has if hung on a cable and it has long been established that weights reduce the vibration.

The vibration dampening means may, however, be omitted if desired.

It will be seen that the clamp has practically a universal freedom of movement in the hanger. It may rock in the vertical plane longitudinally of the hanger. It may jump up and down to a limited extent within the hanger. It may roll to a limited extent from side to side transversely of the conductor, and it may oscillate in the horizontal plane, using the projection on the bottom of the clamp as the part on which it oscillates as shown in dotted lines in Fig. 5. This freedom of movement of the clamp avoids any distinct checking of any vibrations or other movements of the conductor which arise at one side of the clamp, and permits such movement to pass on to the opposite side of the hanger.

What we claim is:

1. In a suspension clamp for horizontal electric conductors and the like, the combination of a trough-shaped support; a clamp in said trough-shaped support; a support between the bottom of the trough-shaped support and the bottom of the clamp intermediate the sides and ends of the trough and on which the clamp may rock relative to the trough-shaped support, the sides of the clamp being normally spaced from the trough-shaped support to permit free rocking and vibration of the clamp transversely of the conductor in both vertical and horizontal planes.

2. In a suspension clamp for horizontal electric conductors and the like, the combination of a trough-shaped support; a clamp in said trough-shaped support; a support integral with one of said members between the bottom of the trough-shaped support and the bottom of the clamp intermediate the sides and ends of the trough and on which the clamp may rock relative to the trough-shaped support, the sides of the clamp being normally spaced from the trough-shaped support to permit free rocking and vibration of the clamp transversely of the conductor in both vertical and horizontal planes.

3. In a suspension clamp for horizontal electric conductors and the like, the combination of a trough-shaped support; a clamp in said trough-shaped support; a support integral with one of said members between the bottom of the trough-shaped support and the bottom of the clamp intermediate the sides and ends of the trough and on which the clamp may rock relative to the trough-shaped support, the other of said members having a socket in which said last mentioned support is received, the sides of the clamp being normally spaced from the trough-shaped support to permit free rocking and vibration of the clamp transversely of the conductor in both vertical and horizontal planes.

4. In a suspension clamp for horizontal electric conductors and the like, the combination of a trough-shaped support; a clamp rockable in said trough-shaped support, said trough-shaped support having a socket formed in its bottom intermediate its sides and ends and said clamp having a projection on its bottom loosely extending into said socket, said projection being of a length to hold the clamp in spaced relationship to the bottom of the trough-shaped support, the sides of the clamp being normally spaced from the trough-shaped support to permit free rocking and vibration of the clamp transversely of the conductor in both vertical and horizontal planes.

5. In a suspension clamp for horizontal electric conductors and the like, the combination of a clamping member adapted to be engaged with a conductor; and a hanger having a part below the clamping member on which said clamping member is adapted to rest, the inner sides of said hanger being spaced from the sides of the clamping member, the clamping member having an oscillatory engagement with said hanger in both horizontal and vertical planes.

6. In a suspension clamp for horizontal electric conductors and the like, the combination of a clamping member adapted to be engaged with the conductor; and a hanger member having a part below the clamping member on which said clamping member is adapted to rest, the inner sides of said hanger being spaced from the sides of the clamping member, the clamping member having a rolling engagement with the hanger member transversely of the conductor, and also a rocking engagement in a vertical plane longitudinally of the conductor.

7. In a suspension clamp for horizontal electric conductors and the like, the combination of a clamping member adapted to be engaged with a conductor; and a hanger having a part below the clamping member on which said clamping member is adapted to rest, the inner sides of said hanger being spaced from the sides of the clamping member, the clamping member having an oscillatory engagement with said hanger in both horizontal and vertical planes, and also a rolling engagement transversely of the conductor.

8. A device for supporting a suspended cable comprising an under member having an upper side supporting portion, an upper cable-receiving member having an under-side portion co-operating with said upper-side portion for support thereby, one of said portions having a recess beneath the center of the cable of substantially cup-shape, and an element having a portion in said recess co-operating with the bottom thereof in substantially universally-relatively-movable relation thereto and supported between said portions.

Signed at Toronto, Canada, this 26 day of November, 1926.

ARTHUR C. GOODWIN.
THOMAS H. BARNARD.